Sept. 28, 1954 J. W. BEDWELL 2,689,986
FLOATING ICE-CREAM PARLOR
Filed March 8, 1946 2 Sheets-Sheet 1
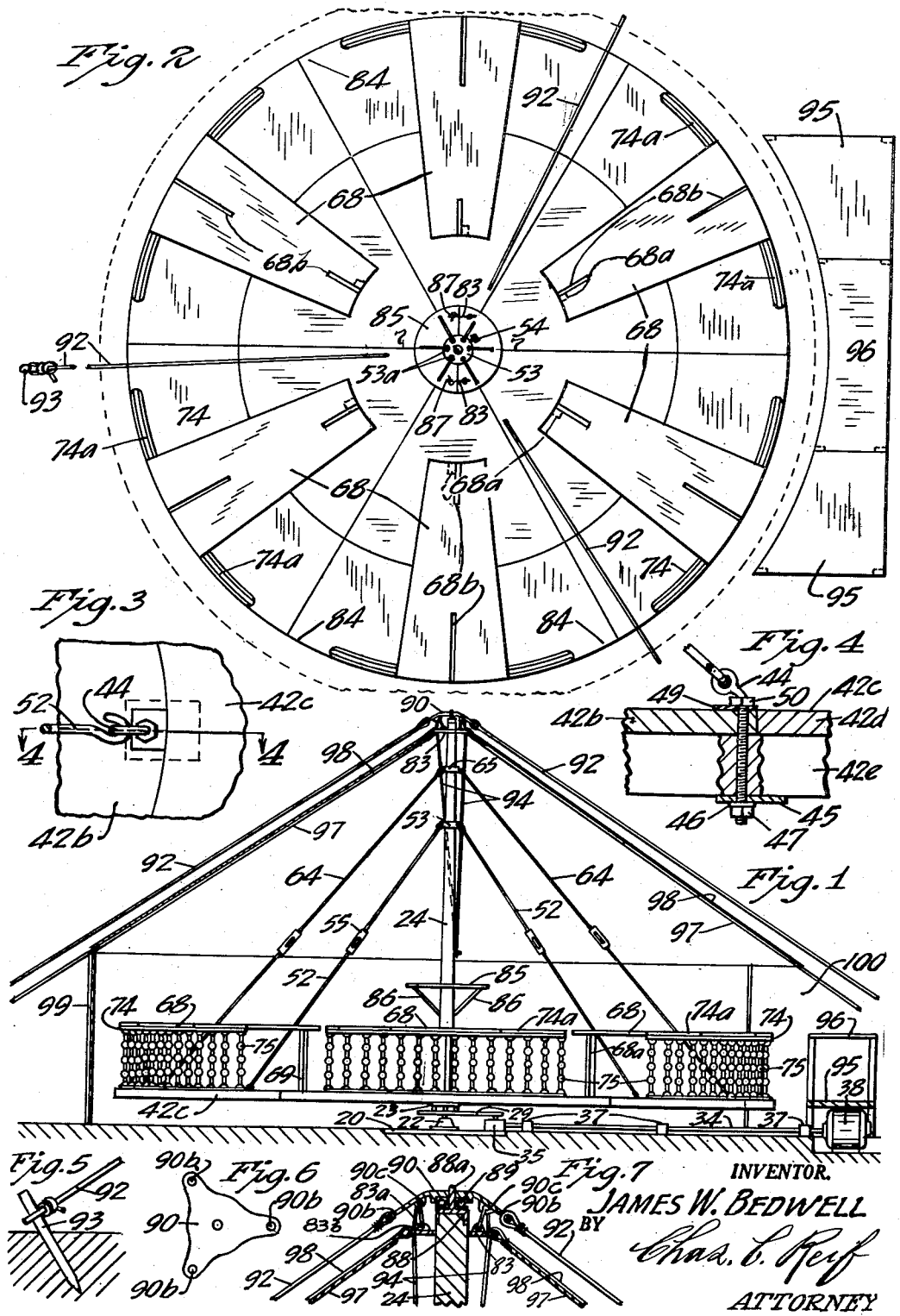
INVENTOR.
JAMES W. BEDWELL
BY
Chas. E. Reif
ATTORNEY

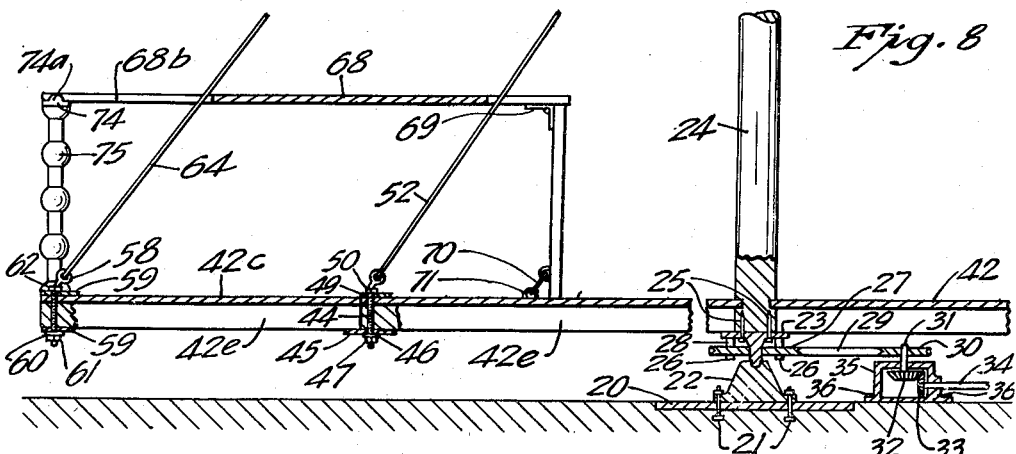
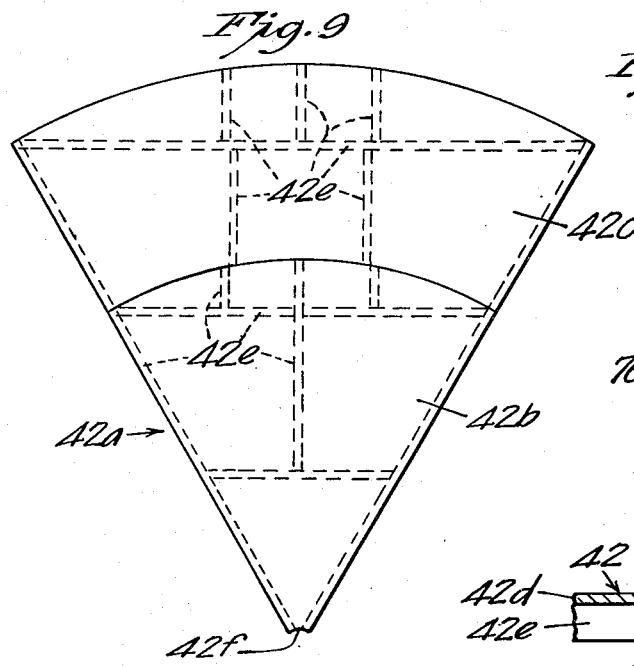
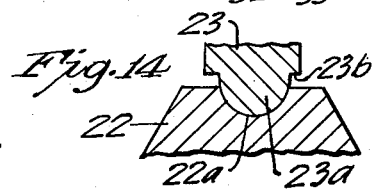
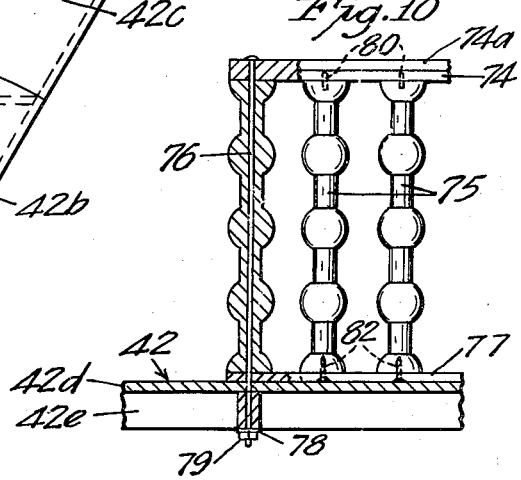
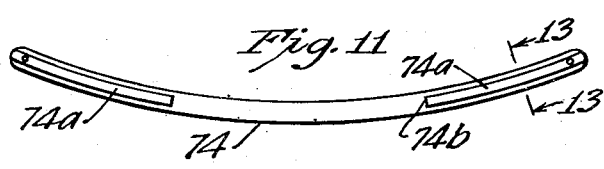
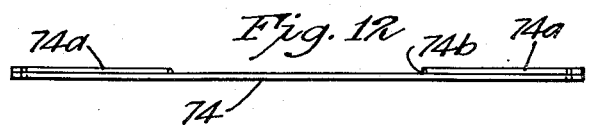

Patented Sept. 28, 1954

2,689,986

UNITED STATES PATENT OFFICE 2,689,986

FLOATING ICE CREAM PARLOR

James W. Bedwell, Minneapolis, Minn.

Application March 8, 1946, Serial No. 653,203

3 Claims. (Cl. 20—1)

This invention relates to a device comprising a rotatable platform on which tables are preferably supported so that refreshments may be served to patrons on said platform.

It is an object of this invention to provide a device comprising a rotatable platform adapted to have tables supported thereon on which refreshments may be served and means for slowly rotating said platform.

It is a further object of the invention to provide a device comprising a rotatable platform preferably of circular shape, a plurality of tables supported on said platform preferably arranged radially in circumferentially spaced relation together with a stationary platform adjacent the periphery of said platform from which articles may be transferred to said tables and articles may be transferred from said tables to said stationary platform.

It is another object of the invention to provide a rotating ice cream parlor comprising a platform preferably circular in shape, a plurality of tables supported on said platform preferably arranged radially in circumferentially spaced relation, means for supporting said platform so that it has a slight gyratory motion, and means for rotating said platform.

It is also an object of the invention to provide a rotating device on which refreshments may be served comprising a rotatable platform preferably of circular shape, a vertically extending pole disposed at the center of said platform, said pole being arranged for rotative movement, means adjacent the bottom of said pole for supporting the inner portion of said platform, and cables or rod-like members secured adjacent the periphery of the platform in circumferentially spaced relation and extending upwardly to and secured to said pole for supporting the outer part of said platform, and means for rotating said pole to rotate said platform.

It is still further an object of the invention to provide a rotatable device adapted to support people comprising a platform preferably of circular shape, a vertically extending pole at the center of said platform, said platform having a plurality of inner sections substantially of sector shape, means adjacent the bottom of said pole for supporting the inner ends of said sections, cables or rod-like members secured to said sections adjacent their peripheries and extending upwardly to and secured to said pole, said platform also comprising semi-annular sections of segmental shape supported at their inner portions on means carried by said inner sections and cables or rod-like members secured in circumferentially spaced relation adjacent the periphery of said outer sections and extending upwardly to and secured to said pole.

It is still another object of the invention to provide a device such as set forth in the preceding paragraph, together with means for rotating said pole to rotate said platform.

Another object of the invention is to provide a rotating device adapted to support people comprising a platform preferably of circular shape, a vertically extending pole at the center of said platform rotatably and oscillatably mounted at its lower end, means for supporting said platform wholly from said pole, means for rotating said pole to rotate said platform, and guy members secured adjacent the top of said pole and extending downwardly and outwardly and secured to the ground, said members comprising ropes or similar members having some longitudinal stretch or expansion whereby said platform may have a slight gyratory motion as people step thereon.

It is more specifically an object of the invention to provide a rotating device on which refreshments may be served comprising a platform preferably circular in shape and preferably disposed a short distance above the ground, said platform having a central pole on which it is supported, together with means for rotating said pole and platform, a plurality of tables carried on said platform, and means extending from adjacent the top of the pole to the ground for preventing any great lateral movement of said pole, said platform preferably being composed of separable sections and said tables preferably being removable and collapsible.

It is also an object of the invention to provide such a device as set forth in the preceding paragraph, together with a stationary platform at one side of said circular platform, said stationary platform being spaced a short distance from said movable platform whereby articles can be transferred from said stationary platform to the tables on said movable platform and from said tables to said stationary platform.

These and other objects and advantages of the invention will be fully set forth in the following description made in connection with the accompanying drawings in which like reference characters refer to similar parts throughout the several views and in which:

Fig. 1 is a view in side elevation of the device, some parts being shown in vertical section;

Fig. 2 is a top plan view, some parts being broken away and some shown in dotted lines;

Fig. 3 is a partial plan view shown on an enlarged scale;

Fig. 4 is a partial vertical section taken substantially on line 4—4 of Fig. 3;

Fig. 5 is a partial vertical section showing the anchor stake for guy ropes or cables;

Fig. 6 is a partial plan view of the device for holding the center pole;

Fig. 7 is a vertical section taken on line 7—7 of Fig. 1;

Fig. 8 is a partial central vertical section;

Fig. 9 is a plan view of one of the platform sections;

Fig. 10 is a partial view in side elevation, certain parts being shown in vertical section;

Fig. 11 is a plan view of a table-holding member;

Fig. 12 is a view in side elevation of Fig. 11;

Fig. 13 is a vertical section taken on line 13—13 of Fig. 11, as indicated by the arrow, Figs. 3 to 13 being shown on an enlarged scale; and Fig. 14 is a partial central vertical section through a step bearing also shown on an enlarged scale.

Referring to the drawings, a device is shown comprising a base member 20, and while this might take various forms, it preferably will be in the form of a plate set into the ground or into a concrete foundation. Plate 20 is preferably circular in shape. Secured to plate 20 by circumferentially spaced headed and nutted bolts 21 is a step bearing 22. Member 22 has a central substantially semi-spherical recess 22a in its upper end. A bearing member 23 has a downwardly extending portion 23a, the lower end of which is substantially semi-spherical and which seats in recess 22a. Portion 23a is of cylindrical form and has an increased diameter just above the top of step bearing 22 thus forming a shoulder 23b. Member 23 has a flange at its upper end and this is secured to the bottom of a vertically extending pole 24 by circumferentially spaced headed screws 25. Portion 23a also has secured thereto by circumferentially spaced bolts 26 a pulley 27 shown as having a grooved periphery. Bolts 26 pass through spacing thimbles 28 between pulley 27 and member 23. Pulley 27 is rotated by a belt 29 running over another grooved pulley 30 secured to a shaft 31 to which is also secured a beveled gear 32. Gear 32 meshes with another beveled gear 33 secured to a shaft 34. Shafts 31 and 34 are journaled in bearings formed in a casing or housing 35 which will be secured to a suitable foundation by bolts 36 passing through a flange at the base of said casing and into a suitable support. Casing 35 encloses gears 32 and 33. Shaft 34 extends some distance from casing 35 through suitable spaced bearings 37 and will be connected to the driving shaft of a suitable motor 38. While motor 38 may be of any desired type, it is illustrated as an electric motor which may include a speed-reducing mechanism not shown. Pole 24 above referred to extends for quite a distance above member 23, as shown in Fig. 1.

A platform 42 is provided and while this could be variously formed, in the embodiment of the invention illustrated it is made of a plurality of separable sections 42a. The sections 42a are of sector-shape and there will preferably be six of these sections. Platform 42 is preferably circular in plan and is so shown. Section 42a preferably comprises an inner section 42b also of sector shape and an outer section 42c which is semi-annular and segmental in form. Platform 42 comprises a top layer of boards 42d and these are secured to and supported by members 42e which are preferably 2 x 4 or 2 x 6 timbers. The arrangement of timbers 42e is shown in Fig. 9. The sections 42a at their inner ends are provided with a curved recess 42f which fits about the bottom portion of pole 24. The flange at the top of member 23 projects outwardly some distance from pole 24 and thus forms a ledge on which the inner ends of sections 42a are supported. At the outer end of sections 42b and disposed in line with the separating line between said sections are eye bolts 44. Each bolt 44 extends through a plate 45 engaging the underside of sections 42b and 42c. Plate 45 will engage the bottom of timbers 42e. A washer 46 engages a plate 45 and a nut 47 threaded on bolt 44 engages washer 46. Bolt 44 also preferably passes through a plate 49 engaging the top of section 42b and is engaged by a nut 50 also threaded on bolt 44. It will be noted that plate 45 projects beyond section 42b and thus forms a support for the inner end of section 42c. Bolt 44 is bent at its upper end to incline inwardly and the same has passing through the eye thereof and secured therein in any suitable manner a cable or rod 52 which preferably is made of metal and which extends upwardly and inwardly and is secured at its upper end in any suitable manner to a ring 53 secured to pole 24. Ring 53 is secured to pole 24 in any suitable manner, as by one or more set screws 54, and said ring has a plurality of circumferentially spaced holes 53a through which members 52 pass and in which they are secured. Members 52 are preferably divided intermediate their ends and connected by turnbuckles 55 by means of which they can be somewhat lengthened or shortened. Eye bolts 58, similar to eye bolts 44, are also disposed adjacent the outer ends of sections 42c and these also have their axes in alignment with the dividing line between adjacent sections. Bolts 58 pass through plates 59 engaging respectively the top of platform 42 and the bottom of timbers 42e. Washers 60 engage the bottom of lower plates 59 and are in turn engaged by nuts 61 threaded on bolts 58. Nuts 62 threaded on bolts 58 engage the tops of upper plates 59. Bolts 58 are bent to incline inwardly at their upper ends and cables or rods 64 pass through the eyes thereof and are secured therein in any suitable manner. The rods or cables 64 extend upwardly and inwardly and have their upper ends secured to a ring 65, similar to ring 53, secured to pole 24 some distance above ring 53. From the above description it will be seen that platform 42 is supported from pole 24 to which member 23 is secured. Member 23 can be considered part of pole 24.

Supported upon platform 42 are a plurality of tables 68. While these tables might be variously arranged, in the embodiment of the invention illustrated, they are shown as disposed in circumferentially spaced relation and in radial arrangement. The table tops are shown as in the form of a segment of a sector. The outer ends of the tables are semi-circular in form, being formed on substantially the same radius as the periphery of platform 42, and said outer ends are substantially in vertical alignment with said periphery. The inner ends of table 68 are also shown as semi-circular in form. The tables are supported at their inner ends by vertically extending legs 68a which at their upper ends are hinged to the undersides of said tables by hinges 69. Legs 68a engage platform 42 at their lower ends and will be held in place by some suitable means, such as a hook member 70 pivotally connected thereto and adapted to hook into a staple 71 secured in platform 42, said hook being at the outer side of leg 68a. Tables 68 at their outer ends rest upon a member 74 of arcuate form disposed in substantially vertical alignment with the periphery of platform 42 and supported upon vertically extending posts or railing 75. Member 74 has a bead 74a at its top and this is cut away at the central portion thereof to form a recess 74b which receives the outer end of table 68. While posts 75 could be variously formed, in the embodiment of the invention illustrated, they are shown as cylindrical and having enlarged balls spaced thereon. Headed bolts 76 extend through members 74 adjacent their ends and downwardly through bores in the end posts 75, through a bar 77 resting on platform 42, and through said platform including timbers 42e, said bolts having washers 78 engaging the bottom of timbers 42e and having nuts 79 threaded thereon engaging washers 78. Posts 75 will be secured to members 74 in any suitable manner, as by having pins 80 disposed in said posts and members 74. Screws 82 may extend through member 77 into the bottoms of posts 75. The members 74 and posts 75 thus form a lattice or railing extending some distance at either side of each table 68 at its outer end. Spaces 84 are left between the ends of adjacent members 74. Spaces 84 provide openings through which persons may enter or step onto the platform 42. A platform 85 preferably is supported on pole 24 some distance above the tops of tables 68. Platform 85 preferably is divided diametrically and clamped to pole 24 so that it can be readily removed. Platform 85 preferably is provided with braces or supports 86 extending from the bottom thereof to pole 24. There will preferably be two members 86 extending from the central part of each half section. Braces 86 may be hinged to the underside of platform 85 and be detachably secured to the pole 24 in any suitable manner. The sections of platform 85 may be connected by pivoted hooks 83 engaging staples 87. Platforms 85 serve to support flowers or other suitable decorations.

At its upper end pole 24 is reduced in diameter and provided with a cap 88, having a central upstanding stem 88a. A ball bearing 89 surmounts cap 88 and is engaged by a top member 90 having a central opening through which stem 88 extends and having a flange 90a surrounding bearing 89. Member 90 has downwardly extending apertured portions 90b. Cables 92, preferably three in number, which are preferably in the form of ropes, are secured in portions 90b and extend downwardly and outwardly to some distance beyond platform 42 where they are secured to stakes 93 driven into the ground. The ropes 92 form guy members which prevent excessive lateral movement at the upper end of pole 24. A ring 83 surrounds pole 24 and is pulled up near cap 88 by and supported by one or more ropes 94 secured to eyelets 83a and passing through apertured lugs 90c on member 90. Ropes 94 will be suitably secured at their lower ends. Ring 83 has holes 83b adjacent its periphery in which are fastened the upper ends of ropes 97 suitably connected as by sewing to the inner side of a tent or canopy 98 extending downwardly to seven or eight feet above the ground. Ropes 97 will be secured to stakes (not shown) driven into the ground similar to stakes 93. A curtain 100 may be placed about platform 42, below tent 98 (at each side of platform 95) and will be suitably supported by stakes 99 and ropes 97.

A stationary platform 95 is located along one side of platform 42, the same having a table 96 at its central portion, the top of which is preferably at the same height as the top of tables 68. Platform 95 and table 96 preferably will have a semi-circular side adjacent platform 42 and spaced a short distance therefrom.

In operation motor 38 will be operated and shaft 37 rotated which will rotate gears 32 and 33 and this will through shaft 31 rotate pulleys 30 and 27 and thus rotate member 23 and pole 24. Platform 42 will thus be rotated. The cables or rods 52 and 64 will rotate with platform 42 but the guy ropes 92 will be stationary, the upper end of pole 24 rotating in bearings 89. The rods 52 and 64, it will be noted, pass through slots 68b formed in the top of each table. The platform 42 will be rotated quite slowly so that the patrons can step on and off of the same without any danger of falling. Chairs will be provided about tables 68 and an operator will stand on platform 95 and set the drinks, ice cream or other refreshments ordered onto the tables 68 as they move past the table or counter 96. There will preferably be one or more operators on the platform to remove used dishes and utensils. The latter can be transferred from the tables to the counter or table 96 as the tables successively move past the latter. It will be noted that pole 24 is capable of rotative movement and also of some lateral or gyratory movement. As the patrons step onto one side of the platform there is a tendency to move that side of the platform downward. The ropes 92 have some stretch or expansion longitudinally and permit a slight movement of pole 24 at its top and thus a slight downward movement at one side of the platform. The movement of pole 24 is limited by shoulder 23b which will engage the top of bearing 22. The platform 42 is therefore capable of a wavy or gyrating motion as it rotates. This gives a floating effect or a boat-like effect. Patrons can only enter platform 42 through the spaces 84. The cables or rods 52 and 64 can be kept adjusted properly by means of turnbuckles 55. When curtain 100 is not used, the patrons at tables 68 can get a universal view of the surroundings as they move about with platform 42. The device is designed for use in street fairs, carnivals and fairgrounds and the patrons can thus get a view of the grounds and attractions as they are partaking of their refreshment. The structure enables the device to be readily dismounted and packed for transportation. The device could be made of a size just to use the inner sections 42b or it could be made as illustrated to have both sections 42b and 42c. If sections 42b only were used, the railing would of course be at the outer edge of said sections and the tables correspondingly smaller. The tables could be made in sections divided at their median lines for this purpose. The sections are readily separable and these, together with the railing comprising members 74 and 75, can be readily disassembled and packed. The sections are readily separable from pole 24, which latter is readily removable from its bearing 22. The device saves a great deal of labor in serving and handling dishes.

From the above description it will be seen that I have provided a very efficient floating ice cream parlor or rotating platform on which patrons may be served. In some cases patrons may wish to merely ride on the device while they rest and view the surroundings. The structure is easily made and assembled and requires little attention for maintenance or operation. The same has been amply demonstrated in actual practice and found to be very successful and efficient.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A rotating device on which refreshments may be served having in combination, a central pole supported for rotation at its lower end, said pole having a ledge adjacent its bottom, a circumferentially circular platform having a plurality of inner sector-shaped sections supported at their inner ends on said ledge, said sections having a ledge at their peripheries extending outwardly, said platform having outer semi-annular segmental sections supported at their inner portion on said last mentioned ledges, tables with inwardly converging sides disposed centrally respectively on said sections, rod-like members or cables secured adjacent the periphery of said inner sections extending upwardly, inclined to the vertical and secured to said pole, and rod-like members secured adjacent the periphery of said outer sections and extending upwardly and secured to said pole.

2. A device of the class described having in combination, a central vertically extending support, having a radially extending supporting ledge adjacent its lower end, a substantially circular platform comprising a plurality of sector-shaped sections supported at their inner ends on said ledge, tables having inwardly converging sides supported centrally of said sections respectively, rod-like members secured adjacent the outer ends of said sections and extending inwardly and upwardly and secured to said support well above said platform, each of said sections having an outer semi-annular portion and an inner sector-shaped portion, said inner-sector-shaped portions having means at their outer sides for supporting said outer portions, and rod-like members secured to the outer sides of said inner portions and extending upwardly and inwardly to and secured to said support for supporting said sections.

3. A rotating member adapted to contain tables having in combination, a central pole rotatably and oscillatably mounted at its lower end, a supporting member adjacent the bottom of said pole secured to and carried by said pole having a radially extending supporting surface, a substantially circular platform having sections supported at their inner ends on said surface, means supporting the outer ends of said sections from said pole, and flexible guy members secured to the upper end of said pole and secured to the ground beyond said platform, said pole being rotatable relatively to said guy member, and means for rotating said pole to rotate said platform, said guy members having some stretch or longitudinally yielding effect so that said pole may oscillate slightly at its top to give a gyrating effect to said platform.

References Cited in the file of this patent

UNITED STATES PATENTS

| Number | Name | Date |
|---|---|---|
| 288,898 | West | Nov. 20, 1883 |
| 396,089 | Johnson | Jan. 15, 1889 |
| 476,597 | Baldwin | June 7, 1892 |
| 870,378 | Maynes | Nov. 5, 1907 |
| 1,013,792 | Lusse | Jan. 2, 1912 |
| 1,041,008 | Brehman | Oct. 15, 1912 |
| 1,094,948 | Strickler | Apr. 28, 1914 |
| 1,140,176 | Martzolf | May 18, 1915 |
| 1,204,681 | Miller | Nov. 14, 1916 |
| 1,412,254 | Meyer | Apr. 11, 1922 |
| 1,706,536 | McClanahan | Mar. 26, 1929 |
| 1,809,951 | Vilfordi | June 16, 1931 |

FOREIGN PATENTS

| Number | Country | Date |
|---|---|---|
| 118,150 | Germany | Mar. 1, 1901 |